Aug. 11, 1936.    A. WEISSELBERG    2,050,477
METHOD AND APPARATUS FOR SPREADING DIVIDED
MATERIAL FOR TREATMENT OR OTHER PURPOSES
Filed March 15, 1935    2 Sheets-Sheet 1
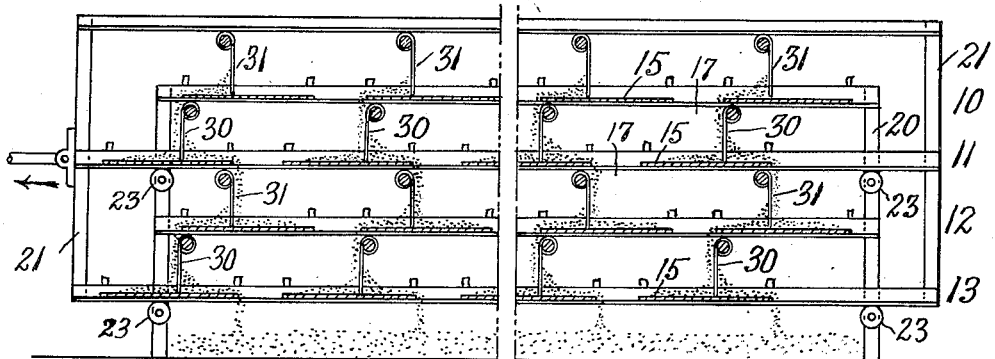
Fig. 1.
Fig. 3.            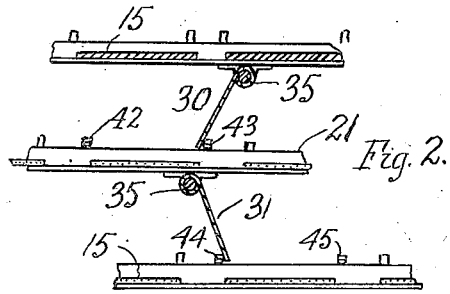 Fig. 2.
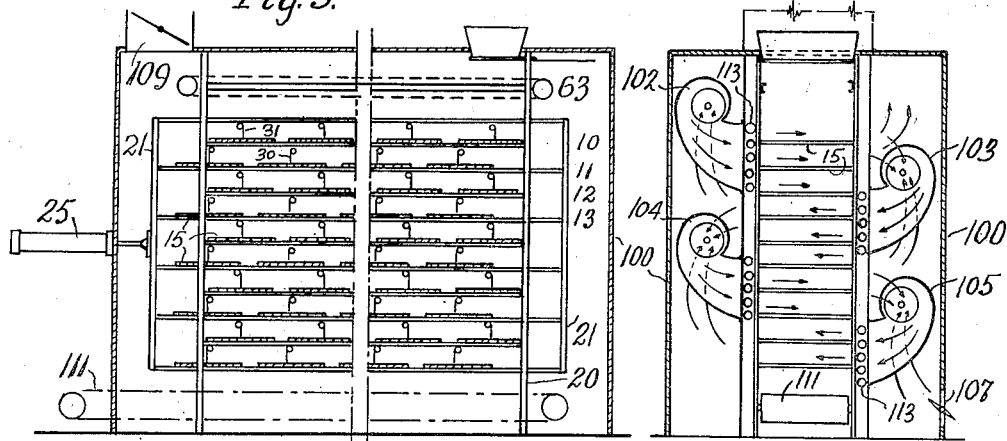
Fig. 4.            Fig. 5.
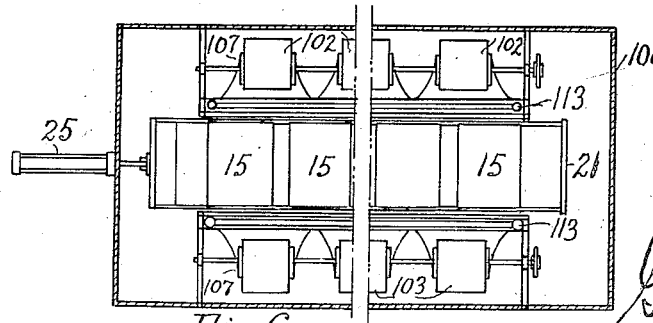
Fig. 6.
INVENTOR.
A. Weisselberg
BY Gustav R. Thompson
ATTORNEY.

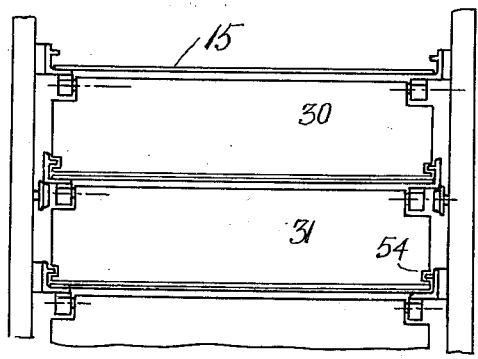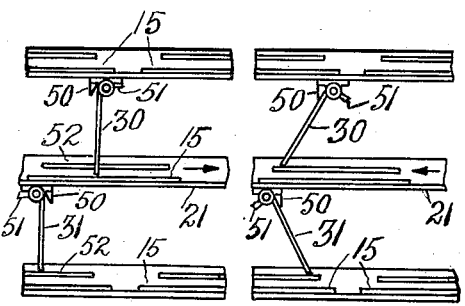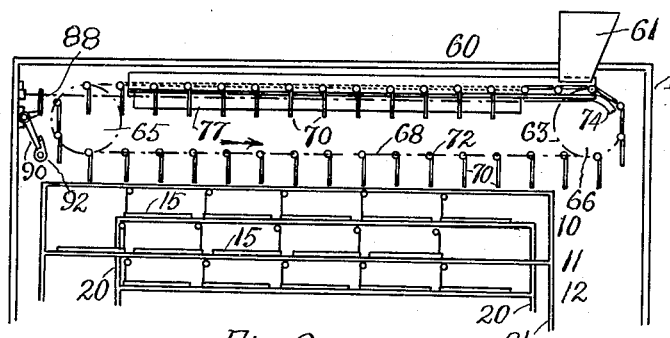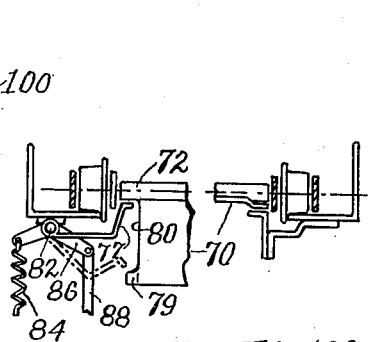

Patented Aug. 11, 1936

2,050,477

UNITED STATES PATENT OFFICE 2,050,477

METHOD AND APPARATUS FOR SPREADING DIVIDED MATERIAL FOR TREATMENT OR OTHER PURPOSES

Arnold Weisselberg, Jersey City, N. J.

Application March 15, 1935, Serial No. 11,224

11 Claims. (Cl. 34—38)

This invention relates to a method and apparatus for spreading divided material, and to a method and apparatus for treating, as drying, oxidizing, etc. the material spread by such method and means, and provides improvements therein.

The invention provides a novel method and apparatus for the continuous handling of divided material in the course of a process or treatment, as for example, heating, drying, oxidation, etc. in which the material is spread on shelves or trays in layers on which it lies for suitable periods of time and is then redistributed and again spread in layers, so that new surfaces of the material may be repeatedly exposed to the treatment involved.

The invention provides an apparatus which is economical of space, has large capacity for its size, is of simple and durable construction, effects a uniform distribution of the material and a uniform and efficient treatment (drying etc.) of the material, and operates reliably and regularly.

An embodiment of the invention is illustrated in the accompanying drawings wherein:

Fig. 1 is a longitudinal vertical section of spreading and distributing apparatus according to the present invention;

Fig. 2 is a detailed view on an enlarged scale, in longitudinal vertical section of a plurality of the rows and shelves shown in Fig. 1 and illustrating the positions of the parts just prior to the leveling operation hereinafter described;

Fig. 3 is a transverse vertical sectional view of the parts shown in Fig. 2;

Fig. 4 is a longitudinal vertical sectional view of drying apparatus incorporating the mechanism illustrated in the preceding views;

Fig. 5 is a transverse vertical section of the apparatus shown in Fig. 4;

Fig. 6 is a longitudinal horizontal view of the apparatus shown in Fig. 4;

Figs. 7, 8 and 8a are views similar to Figs. 2 and 3 of another embodiment of scraping and leveling means;

Figs. 9, 10 and 10a are a longitudinal sectional view and end views of a preferred means for distributing material on the shelves in the top row;

Fig. 11 is a diagram or graph showing the time relation of the operations which are carried on in the drying apparatus.

Referring to said drawings, numerals 10, 11, 12 and 13 illustrate a plurality of straight rows of shelves or trays 15. These rows are arranged at different levels, one above another, and the shelves in each row are spaced from one another as indicated at 17. The rows of shelves are conveniently supported in racks or frames 20, 21.

The rows of shelves 10, 11, 12, 13 etc. are preferably arranged so that the shelves in alternate rows 11 and 13 for example, move into and out of vertical column, or approximately so, with the shelves in the other rows (10 and 12 for example). To this end the frame 21 is made movable. As here shown the frame 21 rests on rollers 23, on the frame 20, and is connected with a reciprocating means 25 of any suitable kind, as a reciprocating pneumatic or hydraulic motor.

Means are provided for periodically scraping material from the shelves in each row onto the shelves at a lower level. These means are conveniently in the form of plates 30, 31, one of these plates being provided for each shelf in each row. Where the apparatus comprises the movable frame 21 the plates 30 are attached to the movable frame and move with it, and when the frame 21 is in its position where the shelves 15 are in vertical column, the plates 30 are located at, or approximately at, the right hand edges of the shelves 15. The plates 31 are located beneath each of the rows of shelves 15 which are supported by the frame 20, at the left hand edges of the aforesaid shelves 15, and when the shelves are in vertical column, the plates 31 are located at, or approximately at, the left hand edges of the shelves which are carried by the movable frame 21.

Means are also provided for leveling the material on the shelves 15. Preferably the scraping means is adapted and arranged to combine the function of leveling. The plates 30, 31 are movable toward and from the surfaces of the shelves 15, and the means by which this is accomplished may comprise a shaft 35 on which each plate 30, 31 is mounted, and which shaft is mounted to turn in bearings 37, 38. Referring to Figs. 2 and 3 the turning of shaft 35 may be restrained by an impositive clutch, as indicated at 40. Suitable means, as fingers or stops 42, 43, 44, 45, are provided for turning the plates 30, 31 at or about the time the shelves 15 complete the movements thereof into and out of column. The fingers 42, 43 may be mounted on the movable frame 21 and the fingers 44 and 45 may be mounted on the frame 20.

Referring to Figs. 7, 8 and 8a, the shaft 35 may have limited turning movement in its bearings. Stop 50 and 51 limit the turning of the plates 30 and 31. The stops 50 limit the turning of the plates 30, 31 in a direction in which the plates can move away from the surfaces of the shelves 15. The plates 30, 31 are held in positions with the lower ends thereof in contact with the shelves 15 by the stops 51. Ledges 52 are provided on which the plates 30, 31 ride in the elevated or leveling position thereof. In the scraping or lowest positions of the plates 30, 31, the ledges 52 pass through notches or grooves 54 in the sides of the plates as shown in Fig. 8. The ledges 52 are of such length that the notched plates 30, 31 pass out of engagement with the ledges 52 at the ends of the movements of the reciprocating frame 21.

A means 60 is provided for charging or filling the top row of shelves in each cycle. This means operates to provide each shelf in the top row with a substantially uniform amount of material. A novel means for this purpose is illustrated in Figs. 9, 10 and 10a. 61 designates a hopper. Beneath the hopper and over the top row 10 of shelves, there is arranged an endless chain conveyor 63, comprising sprockets 65, 66 over which pass chains 68 carrying between them a series of trays 70 which are pivoted as indicated at 72. As each tray or group of trays moves beneath the hopper 61 it carries away enough material to properly fill or charge one shelf 15 in the top row 10. Suitable means, as a guide 74, is provided for turning the trays 70 to a position to receive and hold material from the hopper 61. Means as a rail 77 is provided for holding the trays 70 in a level position during the time the trays are traveling the length of the top row 10 of shelves. The trays 70 are provided with projections 79 which rest on the rail 77. The sides of the tray 70 are cut away as indicated at 80 so as to clear the rail 77 in the hanging-down position of the said trays. Means are provided for moving the rail 77 out of supporting position beneath the projection 79 on the trays so as to allow the trays to turn on the pivots 72 and discharge the contents. To this end the rail 77 may be mounted on a rock-shaft 82, which rock-shaft is operated at suitable times to turn the rail 77 out of position to support the trays 70 by the projections 79, this position being illustrated in dotted lines, Fig. 10. The rock-shaft 82 may be acted upon by a spring 84 to hold the rail 77 in position to support the trays at 70. The rail 77 may be moved out of supporting position by suitable means as a crank-arm 86, link 88, and bell-crank 90, which latter is tripped at suitable intervals by a wiping cam 92 which turns in timed relation to the reciprocating frame 21.

The mechanism heretofore described is advantageously combined with means for forcing air or other gas over the material spread out on the shelves 15. For this purpose the spreading mechanism is enclosed within a housing 100. Fans may be provided for this purpose. These fans are preferably arranged to direct the air therefrom crosswise of the rows of shelves as indicated. There is preferably provided a plurality of these fans 102, 103, 104, 105, etc., arranged at different levels within the housing 100. The series of fans 102 at the left side of the rows of shelves is arranged to blow across one or more of the rows of shelves at a level above that across which the series of fans 103 at the right of the rows of shelves, blow. The series of fans 104 are arranged at the left side of the rows of shelves above the series of fans 105 arranged at the right side of the rows of shelves. The air from the fans 104 blows across the shelves at a level below the stream from the fans 103, and the air from the fans 105 blows across the rows of shelves at a level below the air-streams of fans 104, etc. The inlets 107 to the fans are preferably located within the housing 100 and are preferably arranged opposite the discharge from the fans on the opposite side of the rows of shelves, so that there is a serial passage of the air from a blower on one side, across one or more rows of shelves, through a blower on the opposite side, then across another shelf or series of shelves into and through a fan on the side opposite the last mentioned fan, and so on. A limited amount of fresh air may be admitted to the housing 100 through the valve controlled opening 107, and air allowed to pass from the housing 100 through a valve controlled opening 109. The amount of air passing into and out of the housing 100 may be controlled by the valves at the openings 107 and 109.

The material from the bottom of the shelves may be dropped onto and carried out of the housing by a belt conveyor 111.

Heat may be imparted to the air by means of heating coils 113, these heating coils being preferably located alongside of the rows of shelves in front of the discharge openings of the fans.

*Operation*

A uniform quantity of material is placed on each of the shelves 15 in the top row 10. This preferably is performed by the charging or filling means herein described. The trays 70 receive material from the hopper 61 as the trays are moved under the same by the conveyor 63, and the burdened trays move along in level position over the rows of shelves in the top row 10 until the foremost burdened tray reaches a position over the last shelf 15 in the top row. At this time the wiper cam 92 operates to trip the bell-crank lever 90 which rocks the shaft 82 carrying the rail 77 and turns the said rail 77 out of position to support the trays 70 through the projections 79. The trays 70 then drop or turn on their pivots so as to discharge the material thereon onto the shelves 15 in the top row 10. Before another tray 70 can pass from the hopper to the rail 77, the said rail 77 is restored to supporting position by the spring 84, which is free to act after the wiper cam 92 passes out of contact with the bell-crank lever 90. The cutout portions 80 of the trays 70 permit of the raising of the rail 77 while the trays 70 are hanging down.

It will be convenient to start with the description of the spreading and distributing operation from that part of the cycle where all of the shelves 15 contain a layer of material thereon. To expose new surfaces of the material, the layers on the shelves in each row are scraped therefrom onto shelves in a row at a lower level, and the material on the shelves then leveled. In the construction illustrated the frame 21 is moved toward the left, which carries the shelves thereon out of vertical column with the shelves on the frame 20. Just prior to this movement the plates 30, 31 have been moved into contact or approximate contact with the shelves. In the construction Figs. 2 and 3, this is accomplished by the stops 42 acting against the plates 30 and by the stops 45 acting against the plates 31. In the construction, Figs. 7, 8 and 8a, this is accomplished by the plates 30, 31, riding off of the ledges 52 and falling into position where they are held by the stops 51 and where the ledges are on a level with the notches 54 in the plates. During the scraping, the plates 30, 31, are held in scraping position by means of the clutches 40, Figs. 2 and 3, and by means of the stops 51 and the resistance of the material being scraped off. As the frame 21 moves to the left, the material is scraped off shelves 15 on the stationary frame 20 by the scrapers 30 which are carried by the movable frame 21. At the same time the scrapers 31 on the frame 20 scrape the material from the shelves on the movable frame 21, as these latter shelves move under the scrapers 31. The material drops from a side of the shelf at one level, and, at the next level, drops from the side of the shelf opposite to the side from which it drops at the previous level. When the scraping movement has been completed, the plates or scrapers 30, 31 are moved to a leveling position. In Figs. 2 and 3, this is accomplished by stops 43 acting against the plates 30 and by the stops 44 acting against the plates 31. In Figs. 7, 8 and 8a this is accomplished by the movements of the plates 30, 31 beyond the ledges 52 so that the notches 54 therein are disengaged from the said ledges. On the return movement, the material acting on the plates in the disengaged position swings the plates 30, 31 upward until the turning movement thereof is stopped by the stops 50. In this position the bottom edges of the plates 30, 31 are at the level of the upper side of, and ride on, the ledges 52. In Figs. 2 and 3 the clutches 40 hold the plates 30, 31 at the leveling position. During the return movement (to the right in the drawings) the shelves move into column, and the plates 30, 31 traverse the tops of the shelves, leveling the material thereon.

After the material has been transferred from the shelves in one row to the shelves in another row, and leveled, the material may be allowed to rest for a suitable time on the shelves. The material may undergo any suitable treatment in the interval. For example, air may be blown across the rows of shelves, the passage of the air preferably being serial as heretofore described. Instead of air, a gas having an oxidizing or similar action on the material may be used, or the material treated in any other suitable or desired way.

One cycle of operation, and a part of another, according to one arrangement is illustrated diagrammatically in Fig. 11, which is self explanatory.

The method herein described is independent of the particular apparatus illustrated, though carried out by means of apparatus and comprises the depositing of material on a straight top row of spaced shelves beneath which are other straight rows of spaced shelves at different levels, and at intervals scraping the material from each row of spaced shelves onto shelves in the next lower row, then leveling the material on the shelves so that in the intervals between the scraping and leveling the material lies in layers of substantially uniform thickness on said shelves, the scraping and leveling being preferably accomplished by reciprocating alternate rows of shelves at intervals to and from positions where the shelves are in and out of vertical columns. The scraping of the material from each row of spaced shelves onto shelves in the next lower row being done during that part of reciprocation in which the shelves are moving out of column, and the leveling of the material on the shelves being performed during that part of the reciprocation in which the shelves are moving into column.

The invention may receive other embodiments than those herein specifically illustrated and described.

What is claimed is:

1. Apparatus for distributing divided material for treatment or other purposes comprising a plurality of straight rows of spaced shelves at different levels, means for reciprocating the shelves in alternate rows to and from positions where the shelves are in and out of vertical columns, means for scraping material from a row of shelves at one level onto another row of shelves at a lower level during that part of the reciprocation in which the shelves are moving out of column, and means for leveling the material on the shelves during that part of the reciprocation in which the shelves are moving into column.

2. Apparatus for spreading divided material for treatment or other purposes comprising a plurality of straight rows of spaced shelves at different levels, a movable frame for supporting the shelves in alternate rows, means for reciprocating said frame so that the shelves thereon are moved to positions in and out of vertical columns with the other shelves, scrapers for each shelf, the scrapers for the shelves on said movable frame having fixed locations and the scrapers for the other shelves being movable with said frame, said scrapers being so arranged and acting to scrape material from a row of shelves at one level onto another row of shelves at a lower level during that part of the reciprocation of said frame in which the shelves are moving out of column, and means for moving said scrapers to positions where they act as levellers during that part of the reciprocation in which the shelves are moving into column.

3. Apparatus for spreading divided material for treatment or other purposes, comprising a plurality of straight rows of spaced shelves at different levels, a movable frame for supporting the shelves in alternate rows, means for reciprocating said frame so that the shelves thereon are moved to positions in and out of vertical columns with the other shelves, scraping and leveling means for the material on said shelves, said means comprising plates movable toward and away from the surfaces of said shelves, said plates for acting on the material on shelves on said movable frame having fixed locations, and the plates for acting on the material on the other shelves being movable with said movable frame, means for holding said plates in positions close to the surfaces of said shelves where they act to scrape material from a row of shelves at one level onto a row of shelves at a lower level during that part of the reciprocation of the frame in which the shelves are moving out of column, and means for holding said plates away from the surfaces of said shelves where they act to level material during that part of the reciprocation of said frame in which the shelves are moving into column.

4. Apparatus according to claim 3, wherein said plates are pivoted, and further including ledges alongside said plates, said plates having notches for registering with said ledges in the scraping position of the plates and on which ledges the plates ride in the leveling position of the plates.

5. Apparatus according to claim 3, wherein said plates are pivoted, and further including clutches for holding said plates in different angular positions, and stops for moving said plates angularly toward and from the surfaces of said shelves at the extremes of movement of said shelves into and out of column.

6. Apparatus according to claim 1, in combination with means for blowing air or gas across the rows of shelves.

7. Apparatus according to claim 1 in combination with a plurality of fans having delivery openings on each side of the rows of shelves at different levels for directing air or gas across the rows of shelves.

8. Apparatus according to claim 1, further including a housing, and in combination with a plurality of fans located within said housing at different levels and arranged and operating to direct air or gas across the rows of shelves in opposite directions at different levels, said fans on one side having intakes in the spaces substantially in line with streams from fans on the opposite side.

9. Apparatus according to claim 1 in combination with means for supplying substantially uniform quantities of material to the shelves in the topmost row, comprising a series of hinged trays, a hopper, means for moving said trays beneath said hopper to receive material therefrom and over the shelves in said topmost row, a removable track running the length of the shelves in the topmost row and supporting said hinged trays in level position, and means for removing said track to a position where the hinged trays can turn and drop the material thereon onto the shelves below the trays.

10. Apparatus according to claim 1 in combination with means for supplying substantially uniform quantities of material to the shelves in the topmost row, comprising an endless chain-conveyor having thereon a series of hinged trays, a hopper, means for moving said trays beneath said hopper to receive material therefrom and over the shelves in said topmost row, a removable track running the length of the shelves in the topmost row and supporting said hinged trays in level position, and means for removing said track to a position where the hinged trays can turn and drop the material thereon onto the shelves below the trays, said trays on the conveyor flight below the aforesaid track hanging down so that the dropped material may pass through the spaces between the hanging-down shelves.

11. Apparatus for supplying substantially uniform quantities of material to spaced shelves or the like, comprising a series of hinged trays, a hopper, means for moving said trays beneath said hopper to receive material therefrom and over the shelves in said topmost row, a removable track running the length of the shelves in the topmost row and supporting said hinged trays in level position, and means for removing said track to a position where the hinged trays can turn and drop the material thereon onto the shelves below the trays.

ARNOLD WEISSELBERG.